United States Patent
Rosenthal et al.

(10) Patent No.: US 12,459,451 B2
(45) Date of Patent: Nov. 4, 2025

(54) DYNAMIC CURRENT SENSE ADJUSTMENT FOR RING-LIKE POWER DISTRIBUTION

(71) Applicant: Aptiv Technologies AG, Schaffhausen (CH)

(72) Inventors: Thorsten Rosenthal, Mülheim (DE); Andreas Fuchs, Cologne (DE); Emmanuel Boudoux, Cologne (DE)

(73) Assignee: Aptiv Technologies AG, Schaffhausen (CH)

( * ) Notice: Subject to any disclaimer, the term of this patent is extended or adjusted under 35 U.S.C. 154(b) by 296 days.

(21) Appl. No.: 18/135,787

(22) Filed: Apr. 18, 2023

(65) Prior Publication Data

US 2023/0356673 A1 Nov. 9, 2023

(30) Foreign Application Priority Data

May 3, 2022 (EP) .................................. 22171429

(51) Int. Cl.
*B60R 16/023* (2006.01)
*B60W 10/08* (2006.01)
*B60W 20/40* (2016.01)

(52) U.S. Cl.
CPC ......... *B60R 16/0231* (2013.01); *B60W 10/08* (2013.01); *B60W 20/40* (2013.01)

(58) Field of Classification Search
CPC .... B60R 16/0231; B60W 10/08; B60W 20/40
See application file for complete search history.

(56) References Cited

U.S. PATENT DOCUMENTS

| | | | |
|---|---|---|---|
| 6,552,443 B1* | 4/2003 | Johnke | B60R 16/0315 307/10.7 |
| 2018/0244219 A1* | 8/2018 | Sugisawa | H02H 3/087 |
| 2019/0280479 A1* | 9/2019 | Rauwolf | H02J 1/12 |
| 2020/0274375 A1* | 8/2020 | Griffiths | H02J 7/24 |

FOREIGN PATENT DOCUMENTS

CN 108698546 A 10/2018

OTHER PUBLICATIONS

Extended European Search Report issued by the European Patent Office in connection with International Application No. 22171429.8, dated Nov. 7, 2022.

* cited by examiner

*Primary Examiner* — Naeem Taslim Alam
(74) *Attorney, Agent, or Firm* — Harness, Dickey & Pierce, P.L.C.

(57) ABSTRACT

The present invention relates to Electronic Control Units (ECUs) for use in ring-like power distribution architectures as well as to ring-like power distribution architectures comprising such ECUs. It also relates to vehicles comprising such ring-like power distribution architectures. In an aspect, an ECU comprises a first ECU terminal for receiving power from a first power source (PS) terminal of a first power source, means for determining whether current is flowing into the first ECU terminal or out of the first ECU terminal, and means for adjusting a sensitivity of a first ECU fuse associated with the first ECU terminal based on whether current is flowing into the first ECU terminal or out of the first ECU terminal.

16 Claims, 2 Drawing Sheets

DYNAMIC CURRENT SENSE ADJUSTMENT FOR RING-LIKE POWER DISTRIBUTION

CROSS-REFERENCE TO RELATED APPLICATION

This application claims the benefit of European patent application serial number EP 22171429.8 filed on May 3, 2022. The entire contents of which are hereby incorporated by reference herein.

1. TECHNICAL FIELD

The present invention generally relates to ring-like power distribution, which may for example be used in vehicles, in particular smart vehicles. More specifically, the present invention relates to Electronic Control Units (ECUs) for use in ring-like power distribution architectures as well as to ring-like power distribution architectures comprising such ECUs. It also relates to vehicles comprising such ring-like power distribution architectures.

2. TECHNICAL BACKGROUND

Modern vehicles, or smart vehicles, comprise a number of ECUs. Usually, each of these ECUs is responsible for a specific portion, or zone (e.g., rear or front), of the vehicle, centrally bundling control over the respective portion, or zone. The ECUs in smart vehicles are accordingly also often dubbed zone controllers.

In operation, power must be distributed to all of these ECUs. One possibility to achieve this is to switch the ECUs in line. However, if a single interconnection between successive ECUs (or a single ECU) is faulty, this affects all ECUs downstream. That is, a single defect may cut off several ECUs—the farther upstream it occurs, the more ECUs it takes out. Put differently, system availability in case of a defect is generally poor when switching ECUs in line.

System availability can be improved by distributing power to the ECUs in a star-like architecture, i.e., by connecting each ECU independently to a (central) power source. In case of a defect (of a connection or an ECU as such), only the respective ECU is affected. However, such star-like architecture requires a significant amount of wiring, i.e., (at least) two wires per ECU.

An approach offering the best of both worlds—maximum system availability at minimum wiring—is ring-like power distribution. A ring-like power distribution architecture provides for maximum system availability because it allows to reroute power if an interconnection, or ring segment (RS), is faulty.

Figure 1:
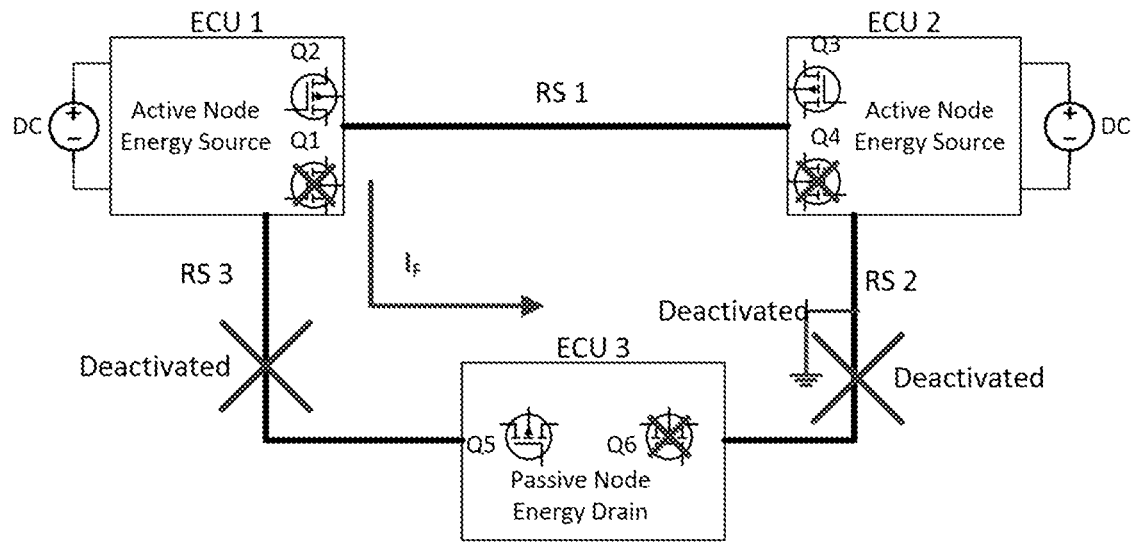

This can be well understood with the help of FIG. 1. FIG. 1 shows a basic ring-like power distribution architecture comprising two active nodes, i.e., ECU 1 and ECU 2, and one passive node, i.e., ECU 3, interconnected by ring segments RS 1, RS 2 and RS 3. More specifically, ring segment RS 1 connects a first terminal, associated with a fuse Q2, of ECU 1 with a first terminal, associated with a fuse Q3, of ECU 2. Ring segment RS 2 connects a second terminal, associated with a fuse Q4, of ECU 2 with a first terminal, to associated with a fuse Q6, of ECU 3. Finally, ring segment RS 3 connects a second terminal, associated with a fuse Q5, of ECU 3 with a second terminal, associated with a fuse Q1, of ECU 1. As ECU 1 and ECU 2 are each provided with a voltage source, they may supply, or inject, power into the ring-like power distribution architecture. Put differently, they are energy sources, or primary power and/or energy sources. ECU on the other hand may be consuming energy from the ring-like power distribution architecture. Put differently, it is an energy drain. That being said, ECU 3 may generally nevertheless also be configured to supply, or forward, power and/or energy to other components, i.e., it may function as a secondary power and/or energy source.

During normal operation, ECU 3 receives power from both ECU 1 and ECU 2. More specifically, ECU 3 receives power from ECU 1 via ring segment RS 3 connecting the terminals associated with fuses Q1 and Q5, respectively (illustrated by angled arrow IF in FIG. 1). Additionally, ECU 3 receives power from ECU 2 via ring segment RS 2 connecting the terminals associated with fuses Q4 and Q6, respectively.

Now assume that ring segment RS 2 fails, providing for a short-circuit (e.g., a connection to ground as indicated in FIG. 1). ECU 3 can no longer receive power from ECU 2 via ring segment RS 2 connecting the terminals associated with fuses Q4 and Q6 since ring segment RS 2 is faulty. However, the power supplied by ECU 2 may be rerouted, e.g., distributed along the opposite direction in the ring-like power distribution architecture. That is, ECU 3 may still receive power from ECU 2 via ring segment RS 1 connecting the terminals associated with fuses Q3 and Q2 and ring segment RS 3 connecting the terminals associated with fuses Q1 and Q5.

Therein, the faulty ring segment RS 2 must be identified and deactivated in full, e.g., cut off at both ends. Since ECU 2 directly feeds into the short-circuit via the terminal associated with fuse Q4, fuse Q4 will (eventually) blow, cutting off, or deactivating, the respective end of ring segment RS2 (illustrated in that fuse Q4 and ring segment RS 2 are crossed out in FIG. 1). Put differently, the overcurrent hailing from ECU 2, caused by the short-circuit in ring segment RS 2, only passes fuse Q4, such that it is necessarily fuse Q4 that will (eventually) blow. However, ECU 1 feeds into the short-circuit via ring segment RS 3 connecting the terminals associated with fuses Q1 and Q5 and, ultimately, the terminal associated with fuse Q6. Put differently, the overcurrent hailing to from ECU 1, caused by the short-circuit in ring segment RS 2, passes fuses Q1, Q5 and Q6. Thus, it may happen that rather than fuse Q6, fuse Q1 or fuse Q5 blows (illustrated in that, exemplarily, fuse Q1 is crossed out in FIG. 1). This is highly undesirable since, if fuse Q1 or fuse Q5 blows, also—intact— ring segment RS 3 is (partially) deactivated (illustrated in that ring segment RS 3 is crossed out in FIG. 1), in effect cutting off ECU 3 completely. In contrast, if (only) fuse Q6 blows, faulty ring segment RS 2 is deactivated in full, e.g., cut off at both ends, without affecting ECU 3, as desired.

The present invention seeks to address this problem. It is noted here that it is not a viable solution to simply choose fuse Q6 such that it blows more easily than fuse Q5 (and fuse Q1), since, as can readily be appreciated from FIG. 1, the issue is mirror-symmetric in the sense that it may also be ring segment RS 3 that fails, which would then require fuse Q5 to blow more easily than fuse Q6 (and fuse Q4).

3. SUMMARY OF THE INVENTION

In a first aspect, the present invention addresses the above problem by providing an ECU for use in a ring-like power distribution architecture according to independent claim 1. An ECU according to independent claim 1 may be a passive node, i.e., it may consume energy from the ring-like power distribution architecture. That being said, it may generally nevertheless also be configured to supply, or forward, power and/or energy to other components, i.e., it may function as a secondary power and/or energy source.

Such an ECU comprises a first ECU terminal for receiving power from a first power source (PS) terminal of a first power source, means for determining whether current is flowing into the first ECU terminal or out of the first ECU terminal, and means for adjusting a sensitivity of a first ECU fuse associated with the first ECU terminal based on whether current is flowing into the first ECU terminal or out of the first ECU terminal. In particular, the means for adjusting may be configured to set the sensitivity of the first ECU fuse to a first value if current is flowing into the first ECU terminal and/or to a second value if current is flowing out of the first ECU terminal, wherein the first value is smaller than the second value. In some embodiments, the second value may be a nominal value that may, e.g., be specified for the first ECU fuse, and the first value may be a value lower than the nominal value.

Herein, a current flowing into the first ECU terminal is a current entering the ECU (via the first ECU terminal), whereas current flowing out of the first ECU terminal is a current leaving the ECU (via the first ECU terminal).

Furthermore, herein, a fuse being associated with a terminal means that said fuse is electrically connected to said terminal. There may or may not be additional components switched in between said fuse and said terminal. Irrespective, a fuse being associated with a terminal means that said fuse may interrupt, or at least minimize, current flowing into and/or out of said terminal. A fuse blowing, or being blown, means that current flowing into and/or out of a corresponding terminal is interrupted, or at least minimized, at least until one or more measures are taken to reinstate, or reactivate, the fuse. If a current is minimized, it may be negligible. In particular, it may be negligible as compared to currents flowing into and/or out of a corresponding terminal when the fuse is not blown. That is, it may be negligible in the sense that it is at least 1,000 times, preferably at least 100,000 times, even more preferably at least 1,000,000 times smaller, most preferably 10,000,000 times smaller than currents flowing into and/or out of a corresponding terminal when the fuse is not blown.

Such an ECU may ensure that the first ECU fuse associated with the first ECU terminal may be adjusted depending on whether current is flowing into the first ECU terminal or out of the first ECU terminal. In particular, such an ECU may ensure that the first ECU fuse associated with the first ECU terminal blows less easily (i.e., the sensitivity of the first ECU fuse is set to a low, or relatively lower, first value) as long as current is flowing into the first ECU terminal, i.e., in the "right" direction. If current is however flowing out of the first ECU terminal, i.e., in the "wrong" direction, the ECU may adjust the first ECU fuse associated with the first ECU terminal to blow more easily (i.e., the sensitivity of the first ECU fuse is set to a high, or relatively higher, second value that is greater than the first value).

For a better understanding, assume ECU 3 of FIG. 1 was replaced with the above-described ECU, such that the first ECU terminal, with which the first ECU fuse is associated, is the terminal associated with fuse Q6 as per FIG. 1. Inter alia, this ECU receives, via said terminal, power from the terminal associated with fuse Q4 of ECU 2. That is, the terminal associated with fuse Q4 may be understood as a first PS terminal of a first power source. As long as current is flowing into the terminal in question (i.e., into the terminal associated with fuse Q6), i.e., in the "right" direction, the operation of this terminal is normal and the associated fuse may be adjusted to blow less easily (i.e., the sensitivity of the fuse is set to a low, or relatively lower, first value). If however current is flowing out of this terminal (i.e., out of the terminal associated with fuse Q6), i.e., in the "wrong" direction, due to a defect in ring segment RS 2, the associated fuse may be adjusted to blow more easily (i.e., the sensitivity of the fuse is set to a high, or relatively higher, second value that is greater than the first value), in particular more easily than fuse Q5 (and fuse Q1). Thereby, it can be achieved that it is this very fuse that blows rather than fuse Q5 or fuse Q1, in effect ensuring that only the faulty ring segment RS 2 is cut off, without affecting any of the nodes and/or remaining ring segments RS 1 and/or RS 2, as desired. Put differently, thanks to the techniques described above, ECU 3 may (more) accurately identify faulty ring segment RS 2 and (more) quickly target it, i.e., cut it off (more) quickly.

The node may further comprise means for providing a first signal to the first power source, wherein the first signal is configured to indicate the first power source to adjust a sensitivity of a first PS fuse associated with the first PS terminal of the first power source based on whether current is flowing into the first ECU terminal or out of the first ECU terminal. In particular, the first signal may be configured to indicate the first power source to set the sensitivity of the first PS fuse to a first value if current is flowing into the first ECU terminal and/or to a second value if current is flowing out of the first ECU terminal, wherein the first value is smaller than the second value. In some embodiments, the second value may be a nominal value that may, e.g., be specified for the first PS fuse, and the first value may be a value lower than the nominal value.

That is, just like the above-described ECU ensures that its own fuse(s) (e.g., the first ECU fuse associated with the first ECU terminal) may be adjusted depending on whether current is flowing into the first ECU terminal or out of the first ECU terminal, it may indicate (e.g., assist or instruct) the power source(s) from whose PS terminal(s) it receives power (e.g., the first PS terminal of the first power source) via its terminal(s) to adjust the fuse(s) associated with said PS terminal(s) (e.g., the first PS fuse associated with the first PS terminal of the first power source) based on whether current is flowing into or out of the respective terminal of the ECU meant to receive power from the power source(s) (i.e., the first ECU terminal). In particular, using such means for providing a first signal to the first power source, it may indicate (at least) the first power source to adjust the sensitivity of the first PS fuse associated with the first PS terminal of the first power source (from which the ECU is meant to receive power via its own first ECU terminal) such that it blows less easily (i.e., the sensitivity of the first PS fuse is set to a low, or relatively lower, first value) as long as current is flowing into the first ECU terminal, i.e., in the "right" direction. If current is however flowing out of the first ECU terminal, i.e., in the "wrong" direction, the ECU may indicate (at least) the first power source to adjust the sensitivity of the first PS fuse associated with the first PS terminal of the first power source (from which the ECU is meant to receive power via its own first ECU terminal) such that it blows more easily (i.e., the sensitivity of the first PS fuse is set to a high, or relatively higher, second value that is greater than the first value).

For a better understanding, one can once again assume ECU 3 of FIG. 1 was replaced with the above-described ECU, such that the first ECU terminal, with which the first ECU fuse is associated, is the terminal associated with fuse Q6 as per FIG. 1. In line therewith, ECU 2 may be assumed to represent a first power source, and accordingly, the terminal associated with fuse Q4 may be understood as a first PS terminal of the first power source. As long as current is flowing into the terminal associated with fuse Q6, i.e., in the "right" direction, the operation of this terminal as well as that of the PS terminal from which said terminal receives power, i.e., the terminal associated with fuse Q4, is normal. Hence, not only fuse Q6 may be adjusted to blow less easily (i.e., the sensitivity of fuse Q6 is set to a low, or relatively lower, first value), but also fuse Q4 (i.e., the sensitivity of fuse Q4 is set to a low, or relatively lower, first value, which may or may not be the same low, or relatively lower, first value to which the sensitivity of fuse Q6 is set). If however current is flowing out of the terminal associated with fuse Q6, i.e., in the "wrong" direction, due to a defect in ring segment RS 2, not only fuse Q6 may be adjusted to blow more easily (i.e., the sensitivity of the fuse is set to a high, or relatively higher, second value that is greater than the first value), in particular more easily than fuse Q5 (and fuse Q1), as described above. Rather, also fuse Q4 may be adjusted to blow more easily (i.e., the sensitivity of fuse Q4 is set to a high, or relatively higher, second value that is greater than the first value; said second value may or may not be the same high, or relatively higher, second value to which the sensitivity of fuse Q6 is set). If comprising means for providing a first signal as described above, ECU 3 may thus assist ECU 2 in identifying and cutting off faulty ring segment RS 2. In particular, ECU 3 may thus ensure that faulty ring segment RS 2 is identified (more) accurately and targeted, i.e., cut off, (more) quickly.

In some embodiments, the first signal may indicate whether current is flowing into the first ECU terminal or out of the first ECU terminal. Then, the first power source may still need to process the signal (more comprehensively) in order to determine how it shall adjust the sensitivity of the first PS fuse associated with the first PS terminal of the first power source. This may render providing a first signal to the first power source (and the corresponding means, respectively) less complex and/or more efficient at the ECU; it simply needs to forward, i.e., indicate, whether current is flowing into the first ECU terminal or out of the first ECU terminal, without performing any additional processing. In other embodiments, the signal may for example instead indicate one or more specific values, or one or more value ranges, to which the first power source shall adjust the sensitivity of the first PS fuse associated with the first PS terminal of the first power source. This may render providing a first signal to the first power source (and the corresponding means, respectively) more reliable. It may also be advantageous as it centralizes control (at least to an extent) at the ECU.

Irrespective, the first signal may be a digital and/or binary signal. For example, the first signal may either comprise a voltage of 2.5V or 5V. That is, it may indicate (i.e., convey and/or assume) a first value and a second value. The first value may be indicative of current flowing into the first ECU terminal, whereas the second value may be indicative of current flowing or out of the first ECU terminal. Likewise, the first value may be indicative of a first (set of one or more) specific value(s), or (set of one or more) value range(s), to which the first power source shall adjust the sensitivity of the first PS fuse associated with the first PS terminal of the first power source, whereas the second value may be indicative of a second (set of one or more) specific value(s), or (set of one or more) value range(s), to which the first power source shall adjust the sensitivity of the first PS fuse associated with the first PS terminal of the first power source. When digital and/or binary, the first signal may change its value (only) once the direction of current flowing into or out of, respectively, the first ECU terminal changes. Put differently, the first signal may continuously indicate (i.e., convey and/or assume) the first value as long as current is flowing into the first ECU terminal and/or the second value as long as current is flowing out of the first ECU terminal, or vice versa. In other embodiments, the first signal may not be digital and/or binary in the sense that it does not continuously indicate a value. Rather, the first signal may indicate (i.e., convey) an impulse or a burst, e.g., to indicate that (only) once the direction of current flowing into or out of, respectively, the first ECU terminal changes. That is, the first signal may (only) be provided (via the ECU's corresponding means) once the ECU's means for determining whether current is flowing into the first ECU terminal or out of the first ECU terminal determine that current is no longer flowing into the first ECU terminal, but rather out of the first ECU terminal, or vice versa.

The means for providing the first signal to the first power source may be a separate wire. This may ensure that the first signal is provided (more) quickly and reliably to the first power source. While the first signal could for example be provided to the power source along the respective interconnection (e.g., ring segment), or along the opposite direction in the ring-like power distribution architecture (especially if said interconnection, or ring segment, is faulty), using a separate wire is quicker and more reliable.

In particular, the separate wire may be provided with an electrical termination (e.g., a pull-down resistor) on at least one end, preferably at both ends. This allows to detect defects in the separate wire, especially where the signal is a digital and/or binary signal. Due to the electrical termination, it may be ensured that a short-circuit (e.g., a connection to ground) in the separate wire may be identified, such that any signal on the separate wire due to the short-circuit is not mistaken for a first signal as described above. The same applies with a view to any system voltage applied to the separate wire, e.g., a voltage supplied by a battery of a vehicle in which the ECU is used.

The first ECU fuse may comprise a metal-oxide-semiconductor field-effect transistor (MOSFET), preferably configured to deactivate upon detection of an overcurrent. That is, a gate driver of the MOSFET may be configured to remove a gate voltage upon detection of an overcurrent, resulting in the MOSFET being switched off, or deactivated, such that it no longer conducts any, or at most only negligible, current. Conversely, the gate driver of the MOSFET may be configured to apply a gate voltage as long as no overcurrent is detected, resulting in the MOSFET being switched on, or activated, such that it conducts current. In that sense, also a fuse comprising a MOSFET may blow, or be blown, i.e., current flowing into and/or out of a to corresponding terminal is interrupted, or at least minimized, at least until one or more measures are taken to reinstate, or reactivate, the fuse or the MOSFET, respectively, e.g., applying a gate voltage (again). By adjusting a threshold above which a current is deemed to represent an overcurrent, the sensitivity of the MOSFET may be adjusted. That is, if the threshold is set to a first low, or relatively lower, first value, the MOSFET is more sensitive in that it is switched off more easily, i.e., by less strong, or weak(er), currents. Conversely, if the threshold is set to a high, or relatively higher, second value, the MOSFET is less sensitive in that it is switched off less easily, i.e., it requires strong(er) currents to trigger the MOSFET (or, e.g., its gate driver) to switch off. Additionally or alternatively, a current may be damped or amplified before being compared to the threshold (which may then be fixed).

Hence, by adjusting a gain for damping or amplifying a current before comparing it to a (possibly fixed) threshold, the sensitivity of the MOSFET may be adjusted. If the current is damped before comparison to the threshold, the MOSFET is in effect less sensitive in that it is switched off less easily, i.e., it requires (even) strong(er) currents to trigger the MOSFET (or, e.g., its gate driver) to switch off. Conversely, if the current is amplified before comparison to the threshold, the MOSFET is in effect more sensitive in that it is switched off more easily, i.e., it requires (even) weak(er) currents to trigger the MOSFET (or, e.g., its gate driver) to switch off. Exploiting these techniques, MOSFETs have generally proven to be particularly useful as fuses providing for adjustable sensitivity. More generally, it is possible that the first ECU fuse—or any fuse described herein, for that matter—comprises an electronic fuse, or e-fuse for short, which may comprise one or more MOSFETs and/or one or more field-effect transistors (FETs) more generally.

It is noted that, in the sense of the present invention, the above mechanisms—adjusting a threshold above which a current is deemed to represent an overcurrent and, in particular, adjusting a gain for damping and/or amplifying a current before comparing it to a (possibly fixed) threshold—allow to adjust the sensitivity of a fuse more generally.

In some embodiments, the above-described ECU may comprise a second ECU terminal for receiving power from a second power source (PS) terminal of a second power source, means for determining whether current is flowing into the second ECU terminal or out of the second ECU terminal, and means for adjusting a sensitivity of a second ECU fuse associated with the second ECU terminal based on whether current is flowing into the second ECU terminal or out of the second ECU terminal. Additionally, it may further comprise means for providing a second signal to the second power source, wherein the second signal is configured to indicate the second power source to adjust a sensitivity of a second PS fuse associated with the second PS terminal of the second power source based on whether current is flowing into the second ECU terminal or out of the second ECU terminal. That is, the above-described techniques may be readily applied with respect to a second ECU terminal, or any number of further ECU terminals more generally. Accordingly, the above techniques may also be readily applied with respect to a (corresponding) second power source, or any number of (corresponding) power sources. That is, the above-described ECU may be combined with any number of power sources, applying the above techniques with respect to each of them or its corresponding ECU terminals, respectively.

In a second aspect, the present invention addresses the above problem by providing another ECU for use in a ring-like power distribution architecture according to independent claim 12. An ECU according to independent claim 12 may be an active node, i.e., it may supply, or inject, power into the ring-like power distribution architecture. That is, it may be a primary power and/or energy source.

Such an ECU comprises an ECU terminal for providing power to a power drain (PD) terminal of a power drain, means for receiving a signal from the power drain, wherein the signal is configured to indicate the ECU to adjust a sensitivity of an ECU fuse associated with the ECU terminal, and means for adjusting the sensitivity of the ECU fuse associated with the ECU terminal based on the signal.

Such an ECU is capable of processing, or reacting to, a first (or second, or any further) signal as described above, i.e., it is configured to adjust the sensitivity of its ECU fuse associated with its ECU terminal from which it feeds, i.e., provides power to, a power drain, or a PD terminal thereof, respectively, with power, based on a signal it receives from the power drain. Notably, such a power drain may be an ECU as described above, i.e., a passive node. Put differently, an ECU according to the second aspect may interact with an ECU according to the first aspect to adjust the sensitivity of its ECU fuse associated with its ECU terminal from which it feeds an ECU according to the first aspect, or a first ECU terminal thereof, respectively, based on whether current is flowing into said first ECU terminal or out of the first ECU terminal.

For a better understanding, assume ECU 3 of FIG. 1 was replaced with an ECU according to the first aspect and ECU 2 of FIG. 1 was replaced with an ECU according to the second aspect. Then, ECU 3 may provide a first signal to ECU 2, wherein the first signal is configured to indicate ECU 2 to adjust a sensitivity of fuse Q4 (associated with that terminal of ECU 2 from which ECU 2 feeds, i.e., provides, power to ECU 3, or the terminal associated with fuse Q6 of ECU 3, respectively) based on whether current is flowing into or out of the terminal associated with fuse Q6 of ECU 3. As long as current is flowing into the terminal associated with fuse Q6 of ECU 3, i.e., in the "right" direction, fuse Q4 of ECU 2 may be adjusted to blow less easily (i.e., the sensitivity of fuse Q4 is set, e.g., by ECU 2, to a low, or relatively lower, first value, which may or may not be the same low, or relatively lower, first value to which the sensitivity of fuse Q6 is set). If however current is flowing out of the terminal associated with fuse Q6 of ECU 3, i.e., in the "wrong" direction, e.g., due to a defect in ring segment RS 2, fuse Q4 may be adjusted to blow more easily (i.e., the sensitivity of fuse Q4 is set, e.g., by ECU 2, to a high, or relatively higher, second value that is greater than the first value; said second value may or may not be the same high, or relatively higher, second value to which the sensitivity of fuse Q6 is set). As discussed above, this may ensure that faulty ring segment RS 2 is identified (more) accurately and targeted, i.e., cut off, (more) quickly.

In a third aspect, the present invention relates to a ring-like power distribution architecture according to independent claim 13.

Such a ring-like power distribution architecture comprises (at least) a first ECU according to the first aspect and (at least) a second ECU, possibly also a third (or any number of further) ECU(s) according to the second aspect, wherein the second (and, where applicable, the third, or any further) ECU functions as the first (and, where applicable, the third, or any further) power source and the first ECU functions as the power drain.

Put differently, the present invention envisages that various ring-like power distribution architectures may be realized using ECUs as described herein. There may be an arbitrary number of ECUs according to the first aspect, e.g., one, two or up to ten, and an arbitrary number of ECUs according to the second aspect, e.g., one, two or up to ten. There may be fewer, more, or just as many ECUs according to the first aspect as ECUs according to the second aspect in such ring-like power distribution architectures. In this context, it is noted that, e.g., two or more ECUs according to the first aspect, i.e., passive nodes, may (immediately) succeed each other in such ring-like power distribution architectures. These ECUs according to the first aspect still each comprise (at least) a first ECU terminal for receiving power from a first power source (PS) terminal of a first power source, even though one of the two ECUs according to the first aspect receives power from this PS terminal via the other ECU according to the first aspect. Similarly, it is noted that, e.g., two or more ECUs according to the second aspect, i.e., active nodes, may (immediately) succeed each other in such ring-like power distribution architectures. These ECUs according to the second aspect still each comprise (at least) one/a ECU terminal for providing power to a power drain (PD) terminal of a power drain, even though one of the two ECUs according to the second aspect provides power to this PD terminal via the other ECU according to the second aspect.

For the purposes of the present invention, a ring-like power distribution architecture does not necessarily need to form a completely closed ring, or loop, but one or more interconnections, i.e., ring segments, may be omitted, or missing. As such, also an architecture in which an ECU according to the first aspect is (directly) connected to two ECUs according to the second aspect via respective ring segments, however without the ECUs according to the second aspect being (directly) connected to each other, is a ring-like power distribution architecture in the sense of the present invention. For a better understanding, assume ring segment RS 1 was missing from FIG. 1. The resulting architecture would still represent a ring-like power distribution architecture in the sense of the present invention.

In a fourth aspect, the present invention relates to a vehicle comprising a ring-like power distribution architecture according to the third aspect. Such vehicle may be a smart vehicle, in particular an automobile.

4. BRIEF DESCRIPTION OF THE DRAWINGS

Figure 2:
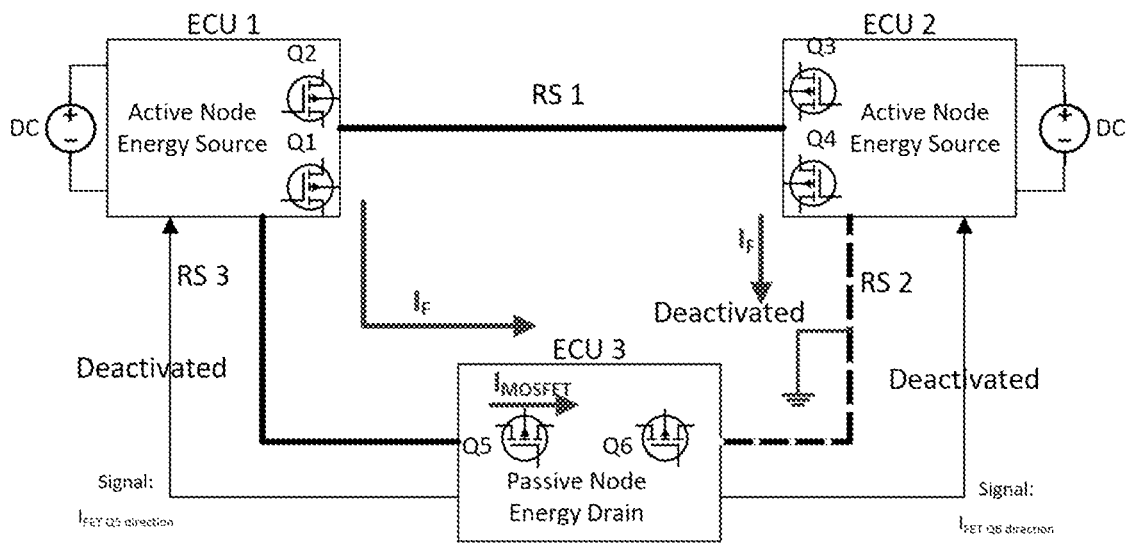
Figure 3:
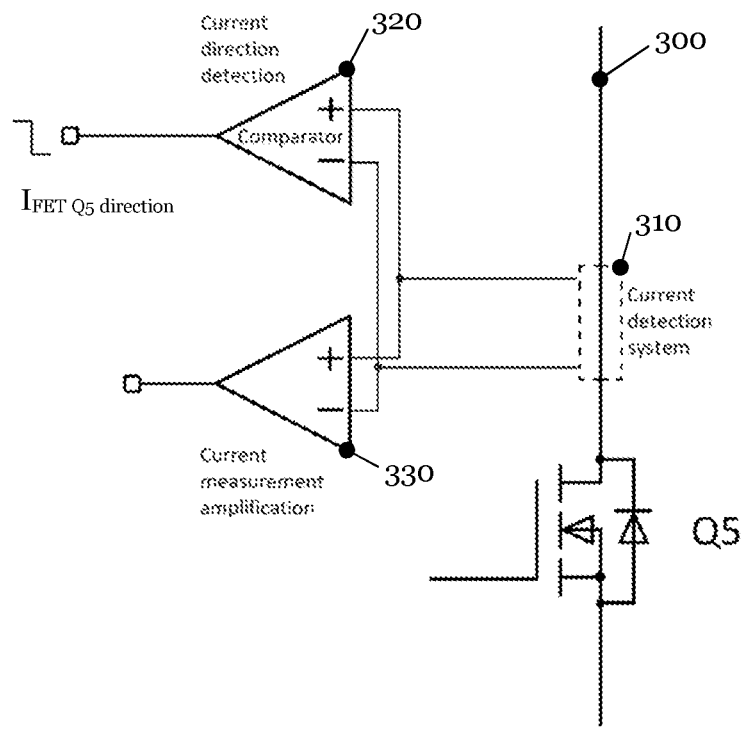
Figure 4:
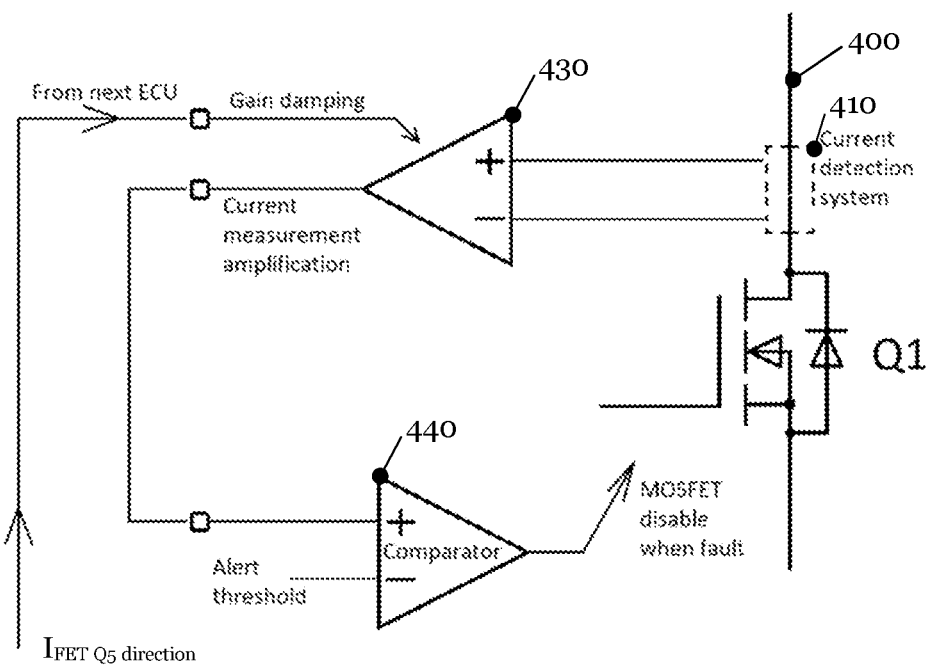

Possible embodiments of the present invention are described in more detail in the following detailed description with reference to the following Figures:

FIG. 1: Example of a ring-like power distribution architecture and associated problems;

FIG. 2: Example of a ring-like power distribution architecture realizing aspects of the present invention;

FIG. 3: Example of circuitry suitable to generate, or provide, a signal in the sense of the present invention;

FIG. 4 Example of circuitry suitable to process, or react to, a signal in the sense of the present invention.

5. DETAILED DESCRIPTION OF POSSIBLE EMBODIMENTS

For the sake of brevity, only a few embodiments will be described below. The person skilled in the art will recognize that the features described with reference to these specific embodiments may be modified and combined in different ways and that individual features may also be omitted. The general explanations in the sections above also apply to the more detailed explanations below.

FIG. 2 shows a ring-like power distribution architecture according to an aspect of the present invention. In particular, the shown ring-like power distribution architecture comprises a first ECU 3 according to the first aspect of the present invention and a second and a third ECU, i.e., ECU 1 and ECU 2, according to the second aspect of the present invention.

The ring-like power distribution architecture shown in FIG. 2 is in large parts identical to that shown in FIG. 1, such that many of the explanations regarding the latter as given above apply here, too, and will hence not be repeated (in this context, it is noted that, as compared to FIG. 1, FIG. 2 comprises a further, non-angled arrow IF illustrating that ECU 3 receives power from ECU 2). Differences stem from ECU 1 and ECU 2 being ECUs according to the second aspect of the present invention and ECU 3 being an ECU according to the first aspect of the present invention.

In particular, ECU 3 comprises means for determining whether current is flowing into or out of the terminals associated with fuses Q5 and Q6, respectively, which are—like all fuses shown in FIG. 2—implemented as MOSFETs. This is illustrated for fuse Q5 (only) by the arrow $I_{MOSFET}$. Furthermore, ECU 3 comprises means for providing a first signal $I_{FET\ Q5\ direction}$ to a first power source that is ECU 1. Likewise, ECU 3 comprises means for providing a second signal $I_{FET\ Q6\ direction}$ to a second power source that is ECU 2.

Assume a defect, e.g., a short circuit, in ring segment RS 2 (illustrated in FIG. 2 in that ring segment RS 2 is shown as a broken line, connected to ground). While this leaves operation at the terminal associated with fuse Q5 normal in the sense that current continues to flow into that terminal, operation at the terminal associated with fuse Q6 is not normal (anymore) in that current is flowing out of that terminal rather than into it. As a result, ECU 3 adjusts the sensitivity of fuse Q5 such that it blows less easily (i.e., the sensitivity of the fuse is set to a low, or relatively lower, first value). Meanwhile, ECU 3 adjusts the sensitivity of fuse Q6 such it blows more easily (i.e., the sensitivity of the fuse is set to a high, or relatively higher, second value). At the same time, ECU 3 provides a first signal $I_{FET\ Q5\ direction}$ to ECU 1 that is configured to indicate ECU 1 to adjust the sensitivity of fuse Q1 such that it blows less easily (i.e., the sensitivity of the fuse is set to a low, or relatively lower, first value). ECU 1 processes, e.g., reacts to, this first signal $I_{FET\ Q5\ direction}$ and adjusts the sensitivity of fuse Q1 accordingly. Meanwhile, ECU 3 also provides a second signal $I_{FET\ Q6\ direction}$ to ECU 2 that is configured to indicate ECU 2 to adjust the sensitivity of fuse Q4 such that it blows more easily (i.e., the sensitivity of the fuse is set to a high, or relatively higher, second value). ECU 2 processes, e.g., reacts to, this second signal $I_{FET\ Q6\ direction}$ and adjusts the sensitivity of fuse Q4 accordingly. Signals $I_{FET\ Q5\ direction}$ and $I_{FET\ Q6\ direction}$ indicate the direction of current at the terminals associated with fuses Q5 and Q6, respectively, i.e., signals $I_{FET\ Q5\ direction}$ and $I_{FET\ Q6\ direction}$ indicate whether current is flowing into or out of the terminals associated with fuses Q5 and Q6, respectively. In the embodiment of FIG. 2, signals $I_{FET\ Q5\ direction}$ and $I_{FET\ Q6\ direction}$ are provided via respective separate wires, each provided with an electrical termination at both ends. Moreover, signals $I_{FET\ Q5\ direction}$ and $I_{FET\ Q6\ direction}$ are digital and/or binary signals. More specifically, signal $I_{FET\ Q5\ direction}$ may comprise a voltage of 2.5V to indicate that current is flowing into the terminal associated with fuse Q5, whereas signal $I_{FET\ Q6\ direction}$ may comprise a voltage of 5V to indicate that current is flowing out of the terminal associated with fuse Q6.

Given these adjustments of fuses Q1, Q4, Q5 and Q6, the overcurrent due to the defect in ring segment RS 2 will cause fuses Q4 and Q6 to blow as they have been adjusted to blow more easily, while fuses Q1 and Q5 have been adjusted to blow less easily. As a result, ring segment RS 2 is deactivated in full, e.g., cut off at both ends, without affecting any of the nodes and/or any of the remaining ring segments RS 1 and/or RS 2.

Concomitantly, power supplied by ECU 2 is rerouted, e.g., distributed along the opposite direction in the ring-like power distribution architecture, to eventually reach ECU 3. That is, ECU 3 still receives power from ECU 2 via ring segment RS 1 connecting the terminals associated with fuses Q3 and Q2 and ring segment RS 3 connecting the terminals associated with fuses Q1 and Q5.

FIG. 3 shows exemplary circuitry suitable to generate, or provide, first signal $I_{FET\_Q5\_direction}$ as it may be comprised in ECU 3. This circuitry comprises fuse Q5 (cf. FIG. 2), a line 300, a resistor, in particular a shunt resistor, 310, a comparator 320 and an amplifier 330. Assume the terminal with which fuse Q5 is associated is connected to line 300, such that, if current is flowing into said terminal, said current, after entering said terminal, first passes resistor 310 before passing fuse Q5. Conversely, if current is flowing out of said terminal, it first passes fuse Q5 and then resistor 310 before exiting through said terminal. This configuration is only exemplary, however. The relative positions of fuse Q5 and resistor 310 may generally be swapped. There may also be additional components placed along line 300.

Either way, current passing resistor 310 will yield a voltage drop across resistor 310. This voltage drop, or rather the corresponding potentials, is/are measured and fed into comparator 320. Accordingly, comparator outputs a signal that indicates a direction in which current is flowing; more specifically, it indicates whether current is flowing into or out of the corresponding terminal. As such, said signal may be used as first signal $I_{FET\_Q5\_direction}$ configured to indicate ECU 1 to adjust the sensitivity of fuse Q1. The function of amplifier 330 shall be explained below, after discussing FIG. 4.

FIG. 4 shows exemplary circuitry suitable to process, or react to, first signal $I_{FET\_Q5\_direction}$ as it may be comprised in ECU 1. This circuitry comprises fuse Q1 (cf. FIG. 2), a line 400, a resistor, in particular a shunt resistor, 410, an amplifier 430 and a comparator 440. Assume the terminal with which fuse Q1 is associated is connected to line 400, such that, if current is flowing into said terminal, said current, after entering said terminal, first passes resistor 410 before passing fuse Q1. Conversely, if current is flowing out of said terminal, it first passes fuse Q1 and then resistor 410 before exiting through said terminal. This configuration is only exemplary, however. The relative positions of fuse Q1 and resistor 410 may generally be swapped. There may also be additional components placed along line 400. Either way, current passing resistor 410 will yield a voltage drop across resistor 410. This voltage drop, or rather the corresponding potentials, is/are measured and damped or amplified using amplifier 430, which applies a corresponding gain.

The output of amplifier 430 is then fed into comparator 440, which compares this output of amplifier 430 with an alert threshold. The output of comparator 440 is then fed to fuse, i.e., MOSFET, Q1 (or, e.g., its gate driver), such that fuse, i.e., MOSFET, Q1 is switched off if the output of amplifier 430 is greater than the alert threshold. Conversely, fuse, i.e., MOSFET, Q1 is not switched off if the output of amplifier 430 is smaller than the alert threshold. That is, fuse, i.e., MOSFET, Q1 may be, or remain, switched on if the output of amplifier 430 is smaller than the alert threshold.

Notably, the gain applied by amplifier 430 is adjusted based on signal $I_{FET\_Q5\_direction}$. As a result, via the gain applied by amplifier 430, signal $I_{FET\_Q5\_direction}$ causes the sensitivity of fuse, i.e., MOSFET, Q1 to be adjusted. For example, if signal $I_{FET\_Q5\_direction}$ indicates ECU 1 to adjust the sensitivity of fuse, i.e., MOSFET, Q1 such that it blows less easily (i.e., the sensitivity of the fuse is set to a low, or relatively lower, first value), the amplifier applies a low(er) gain. As a result, it will require strong(er) currents to trigger fuse, i.e., MOSFET Q1 (or, e.g., its gate driver) to switch off. Conversely, if signal $I_{FET\_Q5\_direction}$ indicates ECU 1 to adjust the sensitivity of fuse, i.e., MOSFET, Q1 such that it blows more easily (i.e., the sensitivity of the fuse is set to a high, or relatively higher, second value), the amplifier applies a strong(er) gain. As a result, weak(er) currents will suffice to trigger fuse, i.e., MOSFET Q1 (or, e.g., its gate driver) to switch off.

Notably, this mechanism may be applied, mutatis mutandis, with respect to amplifier 330 of FIG. 3. That is, a gain applied by amplifier 330 may be adjusted based on a direction in which current is flowing, e.g., based on whether current is flowing into or out of the corresponding terminal. The output of amplifier 330 may then be fed into a(nother) comparator 340 (not shown in FIG. 3) which compares this output of amplifier 330 with an(other) alert threshold. As a result, via the gain applied by amplifier 330, the sensitivity of fuse, i.e., MOSFET, Q5 may be adjusted.

It is emphasized that the circuitries shown in FIGS. 3 and 4 are merely exemplary. For example, the skilled person is readily aware of many other ways to determine the direction of a current, i.e., whether current is flowing into or out of a terminal, for example using a Hall effect sensor.

The invention claimed is:

1. An electronic control unit (ECU) for use in a ring-like power distribution architecture, comprising:
 a first ECU terminal for receiving power from a first power source (PS) terminal of a first power source;
 wherein the ECU performs operations comprising:
 determining whether current is flowing into the first ECU terminal or out of the first ECU terminal; and
 adjusting a sensitivity of a first ECU fuse associated with the first ECU terminal based on whether current is flowing into the first ECU terminal or out of the first ECU terminal.

2. The ECU according to claim 1, wherein the ECU is further configured to set the sensitivity of the first ECU fuse to a first value if current is flowing into the first ECU terminal and/or to a second value if current is flowing out of the first ECU terminal, wherein the first value is smaller than the second value.

3. The ECU according to claim 1, wherein the ECU is further configured to provide a first signal to the first power source, wherein the first signal is configured to indicate to the first power source to adjust a sensitivity of a first PS fuse associated with the first PS terminal of the first power source based on whether current is flowing into the first ECU terminal or out of the first ECU terminal.

4. The ECU according to claim 3, wherein the first signal is configured to indicate to the first power source to set the sensitivity of the first PS fuse to a first value if current is flowing into the first ECU terminal and/or to a second value if current is flowing out of the first ECU terminal, wherein the first value is smaller than the second value.

5. The ECU according to claim 3, wherein the first signal indicates whether current is flowing into the first ECU terminal or out of the first ECU terminal.

6. The ECU according to claim 3, wherein the first signal is a digital and/or binary signal.

7. The ECU according to claim 3, wherein the first signal is provided to the first power source via a separate wire.

8. The ECU according to claim 7, wherein the separate wire is provided with an electrical termination on at least one end.

9. The ECU according to claim 1, wherein the first ECU fuse comprises a metal-oxide-semiconductor field-effect transistor (MOSFET) configured to deactivate upon detection of an overcurrent.

10. The ECU according to claim 1, further comprising:
 a second ECU terminal for receiving power from a second power source (PS) terminal of a second power source;

wherein the operations further comprise:
  determining whether current is flowing into the second ECU terminal or out of the second ECU terminal; and
  adjusting a sensitivity of a second ECU fuse associated with the second ECU terminal based on whether current is flowing into the second ECU terminal or out of the second ECU terminal.

11. The ECU according to claim 10, wherein the operations further comprise providing a second signal to the second power source, wherein the second signal is configured to indicate to the second power source to adjust a sensitivity of a second PS fuse associated with the second PS terminal of the second power source based on whether current is flowing into the second ECU terminal or out of the second ECU terminal.

12. An electronic control unit (ECU) for use in a ring-like power distribution architecture, comprising:
  an ECU terminal for providing power to a power drain (PD) terminal of a power drain;
  wherein the ECU performs operations comprising:
  receiving a signal from the power drain, wherein the signal is configured to indicate to the ECU to adjust a sensitivity of an ECU fuse associated with the ECU terminal; and
  adjusting the sensitivity of the ECU fuse associated with the ECU terminal based on the signal.

13. A ring-like power distribution architecture, comprising:
  a first electronic control unit (ECU) comprising:
    a first ECU terminal for receiving power from a first power source (PS) terminal of a first power source;
    wherein the first ECU performs operations comprising:
      determining whether current is flowing into the first ECU terminal or out of the first ECU terminal; and
      adjusting a sensitivity of a first ECU fuse associated with the first ECU terminal based on whether current is flowing into the first ECU terminal or out of the first ECU terminal; and
  a second ECU comprising:
    a second ECU terminal for providing power to a power drain, PD, terminal of a power drain;
    wherein the second ECU performs operations comprising:
      receiving a signal from the power drain, wherein the signal is configured to indicate to the second ECU to adjust a sensitivity of an ECU fuse associated with the second ECU terminal; and
      adjusting the sensitivity of the ECU fuse associated with the second ECU terminal based on the signal; and
  wherein the second ECU functions as the first power source and the first ECU functions as the power drain.

14. The ring-like power distribution architecture according to claim 13, wherein the first ECU further comprises:
  another ECU terminal for receiving power from a second power source (PS) terminal of a second power source;
  wherein the operations further comprise:
  determining whether current is flowing into the other ECU terminal or out of the other ECU terminal; and
  adjusting a sensitivity of a second ECU fuse associated with the other ECU terminal based on whether current is flowing into the other ECU terminal or out of the other ECU terminal;
  wherein the architecture further comprises a third ECU functioning as the second power source.

15. A vehicle comprising the ring-like power distribution architecture according to claim 13.

16. The ring-like power distribution architecture according to claim 14, wherein the third ECU comprises:
  a third ECU terminal for providing power to a power drain (PD) terminal of a power drain;
  wherein the ECU performs operations comprising:
  receiving a signal from the power drain, wherein the signal is configured to indicate the third ECU to adjust a sensitivity of an ECU fuse associated with the third ECU terminal; and
  adjusting the sensitivity of the ECU fuse associated with the third ECU terminal based on the signal.

* * * * *